(12) United States Patent
Lieberman et al.

(10) Patent No.: US 6,340,229 B1
(45) Date of Patent: Jan. 22, 2002

(54) SOFT CONTACT LENS

(75) Inventors: David M. Lieberman, New York, NY (US); Jonathon Grierson, Atwater, OH (US)

(73) Assignee: Scientific Optics, Inc., New York, NY (US)

( * ) Notice: Subject to any disclaimer, the term of this patent is extended or adjusted under 35 U.S.C. 154(b) by 0 days.

(21) Appl. No.: 09/762,504

(22) PCT Filed: Sep. 8, 1999

(86) PCT No.: PCT/US99/20721

§ 371 Date: Apr. 11, 2001

§ 102(e) Date: Apr. 11, 2001

(87) PCT Pub. No.: WO00/14593

PCT Pub. Date: Mar. 16, 2000

Related U.S. Application Data

(60) Provisional application No. 60/099,426, filed on Sep. 8, 1998.

(51) Int. Cl.[7] .................................................. G02C 7/04
(52) U.S. Cl. .................................................. 351/160 R
(58) Field of Search .......................... 351/160 R, 160 H, 351/161–162, 176–177

(56) References Cited

U.S. PATENT DOCUMENTS

| | | | | |
|---|---|---|---|---|
| 4,194,815 A | * | 3/1980 | Trombley | 351/160 R |
| 5,114,628 A | | 5/1992 | Höfer et al. | 264/1.37 |
| 5,452,031 A | | 9/1995 | Ducharme | 351/177 |
| 5,502,518 A | * | 3/1996 | Lieberman | 351/160 R |
| 5,570,142 A | | 10/1996 | Lieberman | 351/160 R |

* cited by examiner

*Primary Examiner*—Georgia Epps
*Assistant Examiner*—Jordan M. Schwartz
(74) *Attorney, Agent, or Firm*—Darby & Darby

(57) ABSTRACT

A contact lens that reduces power distortion and lens contact with the corneal surface resulting from lens flexure. The contact lens (10) is designed to include a central optical portion, a scleral skirt (90), and a transition portion (34) therebetween, overlying the cornea, the posterior surface of which is conformed to the local geometry of the underlying portion of the cornea, including corneal tilt and distortion. In an alternative embodiment representing a less expensive lens, the transition portion is designed to conform to a statistically average cornea. The central optical portion may have a posterior surface which is customized, is toric or spherical, depending on whether a custom or inexpensive soft lens is being designed.

20 Claims, 7 Drawing Sheets

SOFT CONTACT LENS

CROSS-REFERENCE TO RELATED APPLICATION

This application claims priority pursuant to 35 U.S.C. 119 based upon U.S. Provisional application Ser. No. 60/099,426 filed Sep. 8, 1998, the entire disclosure of which is incorporated herein by reference.

FIELD OF THE INVENTION

The present invention relates generally to contact lenses and to methods of manufacturing contact lenses, and in particular to asymmetric, aspheric contact lenses and methods of manufacture thereof.

BACKGROUND OF THE INVENTION

Thirty to forty percent of the human population under age 40 develop an ocular refractive error requiring correction by glasses, contact lenses, or surgical means. Refractive errors result when the primary optical elements of the eye, the cornea and the lens, fail to image incoming light directly on the retina. If the image is focused in front of the retina, myopia (nearsightedness) exists. If the eye image is focused behind the retina, hyperopia (farsightedness) exists. The focusing power of the eye or any of the eye's individual components is measured in units called diopters.

Approximately 20% of the patients under 40 having vision defects cannot wear contact lenses because the contact lenses do not fit (become dislodged and/or are very uncomfortable), or they fail to provide the requisite optical correction, or both. In addition, many patients who currently wear contact lenses are not satisfied with the length of time they can wear their lenses and/or with the visual acuity their contact lenses provide.

Over age 40, the percentage of the population requiring vision correction dramatically increases because the crystalline lens of the eye becomes relatively inelastic. The quality of the tear film decreases and the problems encountered with existing contact lenses become much more common and acute.

Standard contact lenses are rotationally symmetrical and spherical, vault from the sclera and rest on the cornea. The human cornea, however, is an "asymmetrically aspheric" surface. "Aspheric" means that the radius of curvature along a corneal "meridian" is not a constant (a "meridian" could be thought of as the curve formed by the intersection of the corneal surface and a plane containing the pupillary axis). Indeed, the corneal curvature tends to flatten progressively from the geometric center to the periphery. "Asymmetric" means that the corneal meridians do not exhibit symmetry about their centers. The degree to which the cornea is aspheric and/or asymmetrical varies from patient to patient and within the same person.

Conventional corneal topology mapping systems, such as the PAR CTS, locate the line-of-sight and then map the corneal surface topology in two-dimensional Cartesian space, i.e., along x- and y- coordinates perpendicular to the "line-of-sight." The resulting topology map can be used by the practitioner to plan the surgical procedures. The "line-of-sight" is a straight line segment from a fixation point to the center of the entrance pupil. As described more fully in Mandell, "*Locating the Corneal Sighting Center From Videokeratography*," J. Refractive Surgery, V. 11, pp. 253–259 (July/August 1995), a light ray which is directed toward a point on the entrance pupil from a point of fixation will be refracted by the cornea and aqueous and pass through a corresponding point on the real pupil to eventually reach the retina.

The present inventor has discovered that the cornea, in most patients, is actually naturally tilted to a varying degree with respect to the pupillary axis and the line-of-sight of the eye of the eye. Additionally, the degree of corneal tilt varies within the individual cornea depending on the diameter over which the tilt is measured. More specifically, the intersection between the cornea and the sclera (i.e., the base of the cornea) is tilted with respect to a reference plane that is perpendicular to the line of sight. Research with actual patients has also demonstrated that the eye lids, over time, cause distortions in the shape of the cornea. Specifically, the upper lid causes flattening at the top of the cornea, while the lower lid causes a depression at the bottom.

Spherical lenses do not match the corneal curvature and geometry, and therefore do not fit properly. Furthermore, they do not take into account the corneal tilt or distortion discovered by the inventor. The more irregular the patient's cornea the worse the fit, such that about 20% of the patients under age 40 are unable to wear standard contact lenses.

So called "soft" contact lenses have alleviated some of the problems that patients have experienced in not being able to wear contact lenses or in not being able to wear them for sufficiently long periods of time. This is due, not only, to their relatively soft surfaces, but also to their pliability, which permits them to modify their shape somewhat with different eyes. However, it is this pliability which permits the lenses to flex, in an effort to conform more closely to the underlying corneal shape, and this flexing results in a change in the power of the lens.

The present inventor has found that the portion of a soft contact lens which rests on the sclera of the eye has little effect on lens distortion, owing to the malleability of the conjunctiva, the clear material which covers the sclera (white of the eye). Instead, the distortion is caused primarily by an outer region of the cornea proximate to the sclera.

It is an object of the invention to provide a contact lens that accounts for the natural tilt and distortion of the cornea.

It is another object of the invention to rapidly and economically manufacture contact lenses that provide increased visual acuity by aspherically and asymmetrically matching and/or conforming to a portion of the wearer's cornea.

These goals are achieved by using information obtained by surface modeling the cornea, and by manipulating this information to design a contact lens that takes into account the local geometry of the cornea, including corneal tilt and distortion. In particular, a contact lens is designed in which includes a central optical portion and a transition portion radially outward of the central portion and overlying the cornea, which is conformed to the local geometry of the underlying portion of the cornea, including corneal tilt and distortion. In a soft contact lens, a scleral skirt is also provided and the transition portion connects the central optical portion and the scleral skirt. In an alternate embodiment representing a less expensive lens, the transition portion is designed to conform to a statistically average cornea. The central optical portion may have a posterior surface which is customized, is toric or spherical, depending on whether a custom or inexpensive soft lens is being designed.

BRIEF DESCRIPTION OF THE DRAWINGS

The features and advantages of the present invention will be more fully understood from the following description of preferred embodiments with reference being made to the drawings in which.

DETAILED DESCRIPTION OF PREFERRED EMBODIMENTS

Figure 1:
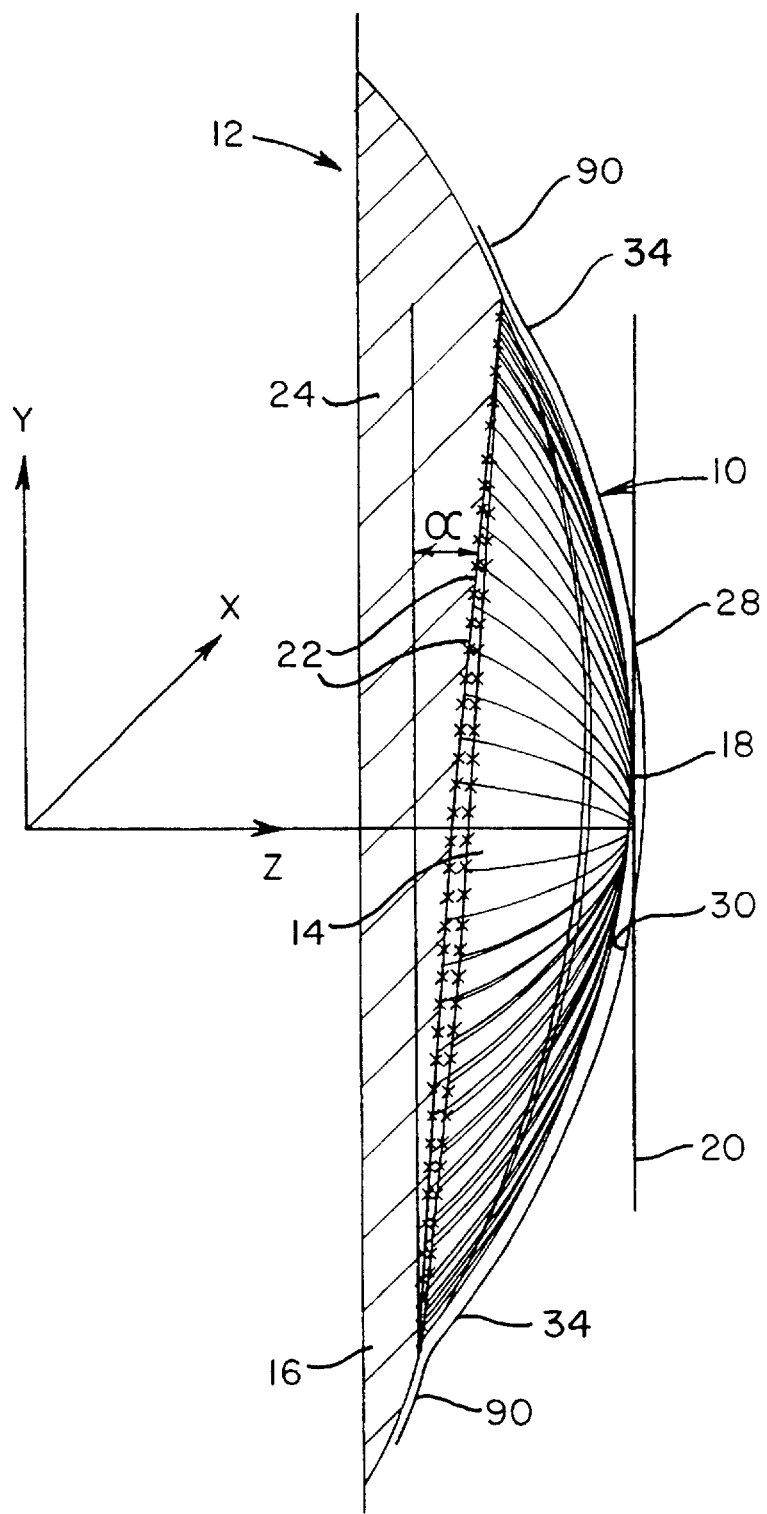
FIG. 1 is a side view (i.e., in the Y-Z plane) of a contact lens embodying the present invention shown placed on a cornea.

Referring now to FIG. 1, an asymmetric aspheric contact lens 10 embodying the present invention is illustrated and is shown placed upon the eye 12 of a wearer. The eye includes a tilted cornea 14 and a sclera 16. Lens 10 has a transition region 34 and a scleral skirt 90 that drapes over a portion of the sclera. Lens 10 is a soft contact lens. If it were a hard contact lens, there would be no scleral skirt.

Figure 2:
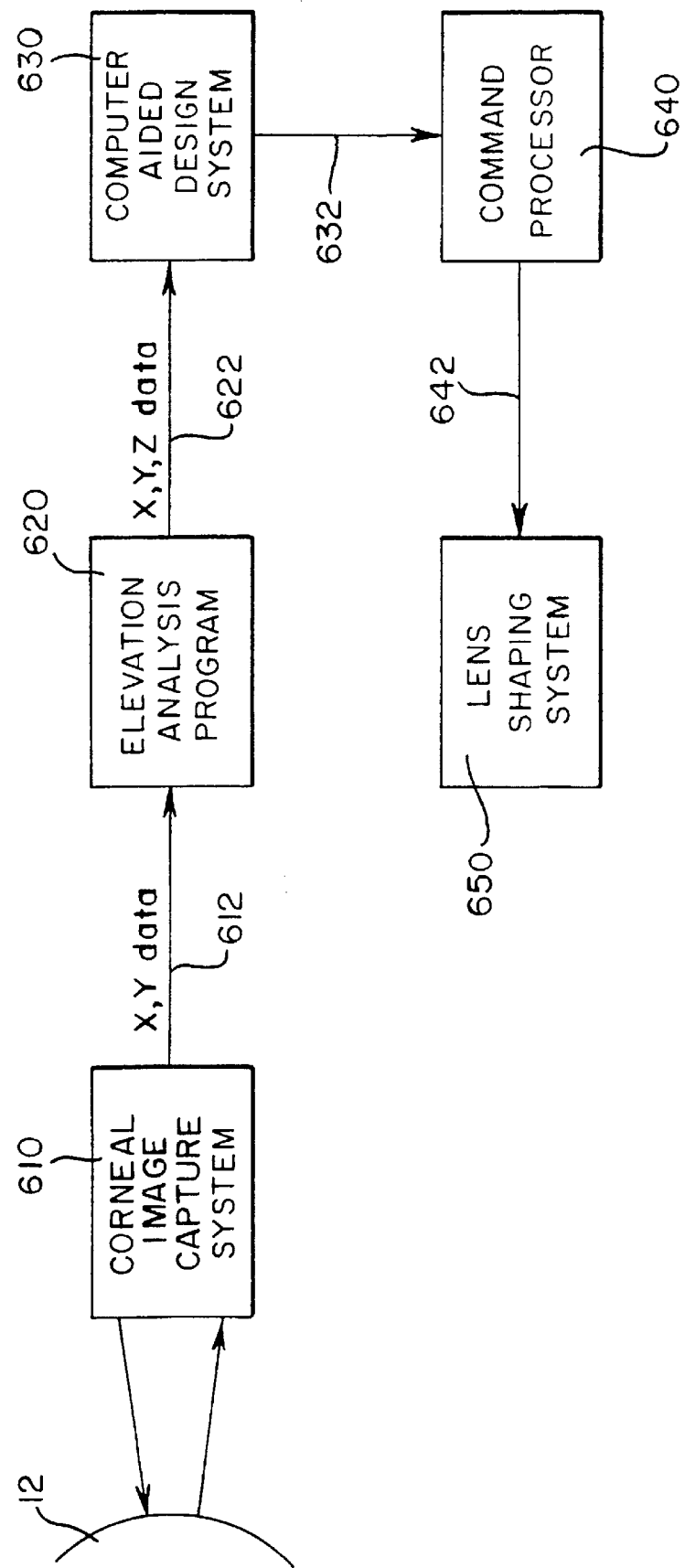
FIG. 2 is a schematic illustration of a system for manufacturing a contact lens.

A process for manufacturing a contact lens in accordance the present invention is illustrated in flow chart form in FIG. 2. The process includes a Corneal Image Capture System 610, an Elevation Analysis Program 620, a Computer Aided Design System 630, a Command Processor 640 and a Lens Shaping System 650. The Corneal Image Capture System 610, in conjunction with the Elevation Analysis Program 620, generates a three dimensional topographic map of the cornea 14 of the patient who is to be fitted with a contact lens. The Computer Aided Design System 630 is used as an aid in editing or modifying the corneal topographic data before sending the data to a Lens Shaping System 650 via the Command Processor 640. The Command Processor 640 uses the topographic data describing the surface of the lens to be shaped from the Computer Aided Design System 630 to generate a sequence of commands/control signals required by the Lens Shaping System 650. The Lens Shaping System 650 accepts, from the Command Processor 640, a sequence of commands that describe the three dimensional movements of the Lens Shaping System (any coordinate system may be used; e.g., cartesian, radial or spherical coordinates) to shape the contact lens.

The Corneal Image Capturing System 610 and the Elevation Analysis Program 620 are preferably components of the PAR® Corneal Topography System ("the PAR® System"), which is available from PAR Vision Systems. The Elevation Analysis Program 620 is a software program executed by a processor, for example an IBM™ compatible PC. Program 620 generates a third dimension element (a Z coordinate representing distance away from a reference plane inside the eye) for each of a plurality of sample points on the surface of the cornea measured by system 610. Each point is defined by its X-Y coordinates as mapped into the reference plane, and its Z coordinate is determined from brightness of the point. One method of calculating the elevation of each point, i.e., the Z coordinate, is by comparing the X-Y and brightness values measured from the patient's cornea 14 with the coordinates and brightness of some reference surface with known elevation, e.g., a sphere of a known radius. The reference values can be pre-stored.

The final output of the Elevation Analysis Program 620 is the X-Y-Z coordinates for a multiplicity of sample points, known as a point cloud, on the surface of the cornea 14. It will be apparent to those skilled in the art that any method can be used that can generate X, Y, Z corneal data providing both location and elevation information for points on the corneal surface with the required accuracy. In the preferred embodiment about 1500 points are spaced in a grid pattern, as viewed in the X-Y plane, so the projections of the points into the reference plane are about 200 microns apart.

The X-Y-Z data output from the Elevation Analysis Program 620 can be formatted in any number of well-known machine-specific formats. In the preferred embodiment, the data are formatted in Data Exchange File (DXF) format, an industry standard format which is typically used for the inter-application transfer of data. A DXF file is an ASCII data file, which can be read by most computer aided design systems.

Figure 3:
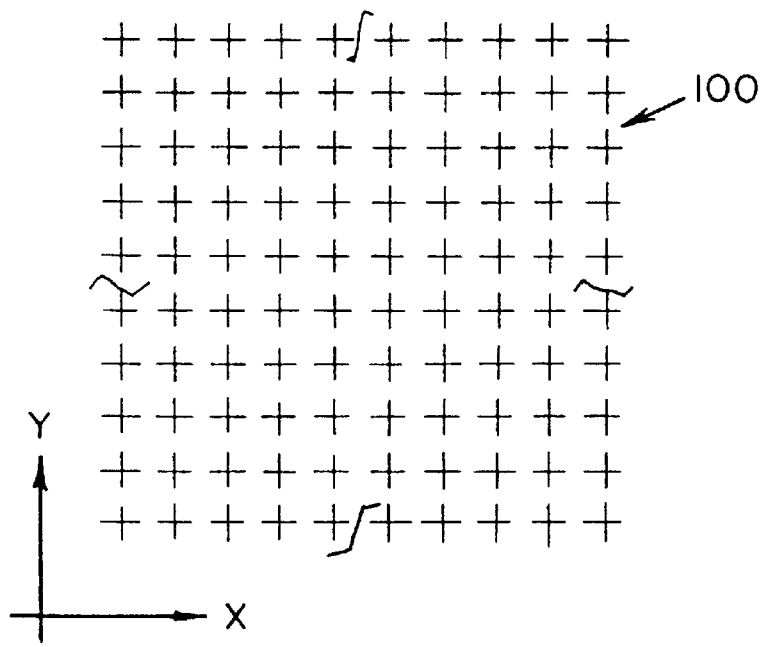
FIG. 3 is a schematic top front view of a point cloud of the type obtained from a corneal topography imaging system.
Figure 4:
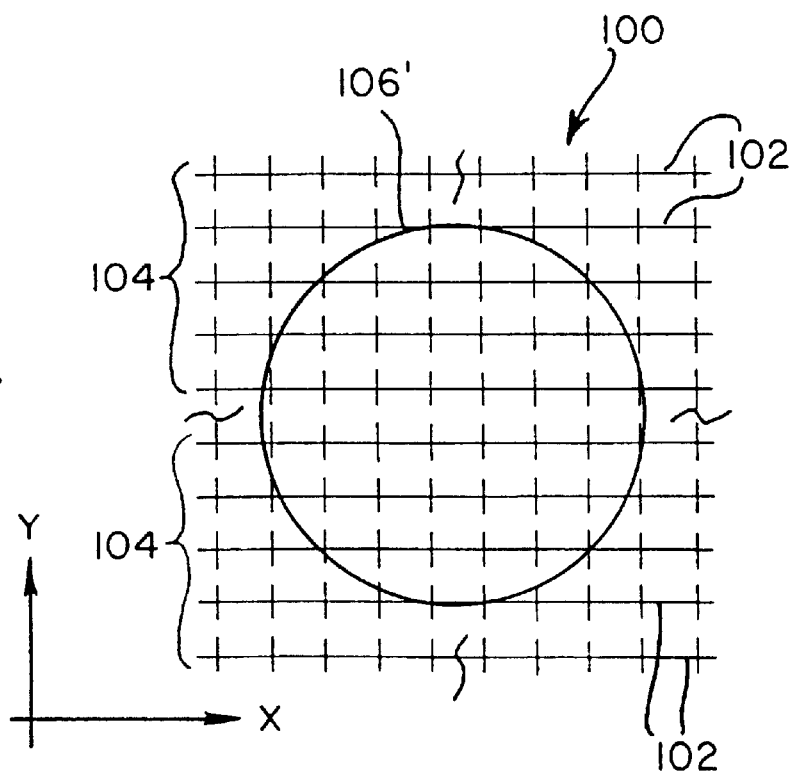
FIG. 4 is a schematic top front view of a point cloud having a plurality of splines connected through the data points.
Figure 5:
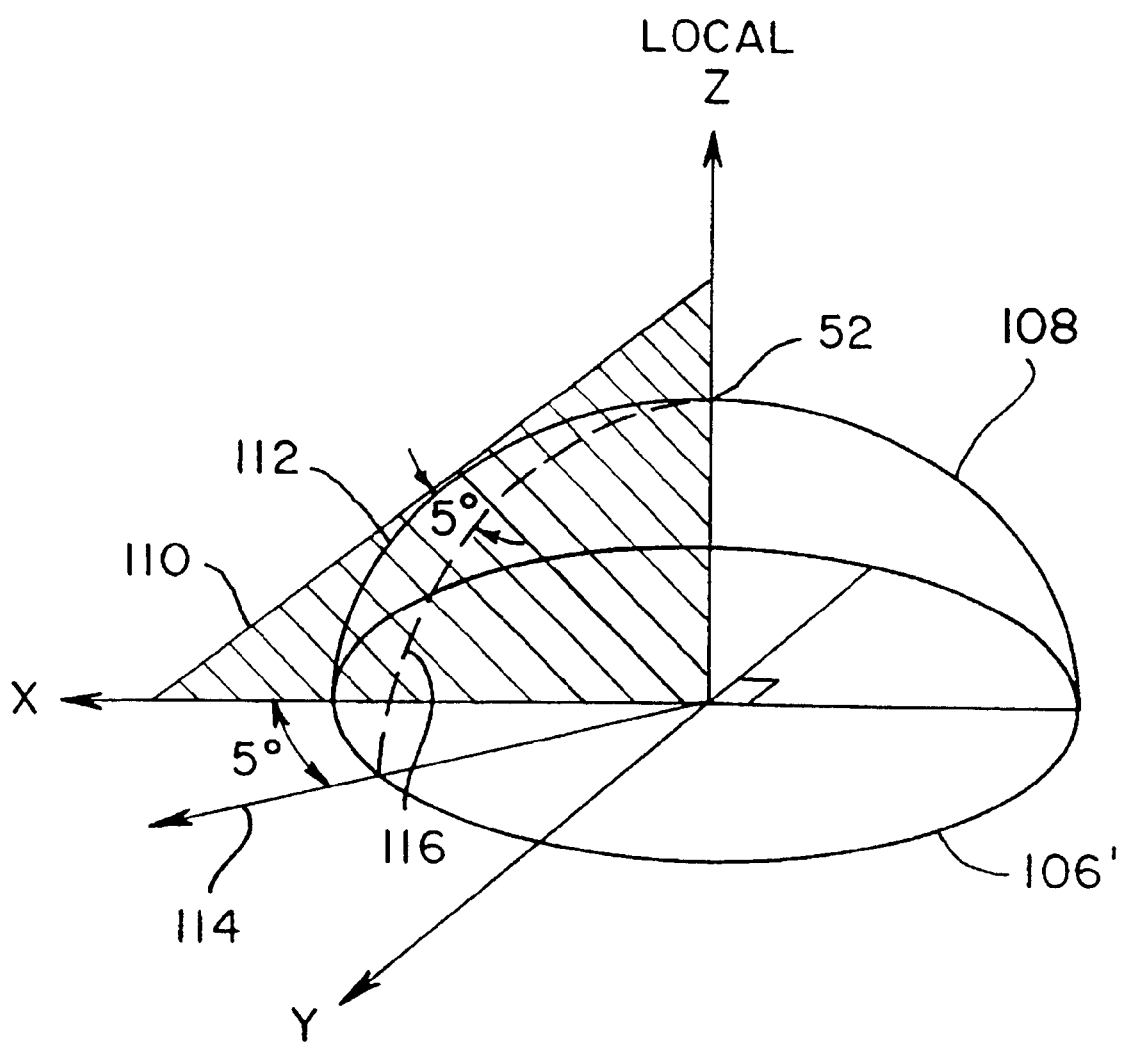
FIG. 5 is a perspective view of a cornea matching surface illustrating how characterizing curves are constructed.

Referring now to FIGS. 3 and 4, a point cloud 100 is depicted as it would appear when viewing the reference plane along the Z-axis (i.e., as projected into the X-Y plane). Each point corresponds to a particular location on the patient's cornea. The data are usually generated from an approximately 10 mm×10 mm bounded area of the eye. Thus, there may be as many as 50 rows of data points. A surface 108 (see FIG. 5) that models or matches the topography of the surface of the patient's cornea is generated by the computer aided design system 630 from the data points generated by the Elevation Analysis Program. In a preferred embodiment, Computer Aided Design System 630 is the Anvil 5000™ program which is available from Manufacturing Consulting Services of Scottsdale, Ariz.

Cornea matching surface 108 is preferably produced by first generating a plurality of splines 102, each through a plurality of the data points of the point cloud 100. The generation of a spline that intersects a plurality of data points (i.e., knot points) is, per se, known to those skilled in the art and can be accomplished by the Anvil 5000™ program once the input data have been entered. For more information regarding the generation of a surface model, see pending U.S. Pat. No. 5,807,381 granted on Sep. 15, 1998 and entitled "Method and Apparatus for Improving Vision", the disclosure of which is hereby incorporated by reference. In a preferred embodiment, the known non-rational uniform B-spline formula is used to generate the splines, but they could be generated by other well-known mathematical formulas for splines, such as the cubic spline formula or the rational uniform B-spline formula. As illustrated in FIG. 4, in a preferred embodiment, each of the splines 102 lies in a plane that is parallel to the X and Z axes and includes a row of points from the cloud 100 in FIG. 3.

Surface 108, which matches the corneal surface of the scanned eye, is then generated from splines 102. There are a number of well-known mathematical formulas that may be used to generate a surface from a plurality of splines 102. In the preferred embodiment, the well known nurb surface equation is used to generate a corneal surface from splines 102. In the embodiment, because the scanned area of the eye is approximately 10 mm×10 mm, approximately 50 splines 102 are created. As illustrated in FIG. 4, a skin surface segment 104 is created for a small number (e.g., five) of the adjacent splines. Adjacent skin surface segments 104 share a common border spline. Thus, about ten skin surface segments are generated from the point cloud and are then merged together by the Anvil 5000™ program in a manner known to those skilled in the art, to produce one composite surface 108.

Neither the original data points, nor the knot points of splines 102 necessarily lie on surface 108, owing to the mathematical generation of the surface when using the nurb surface equation formula. However, the surface 108 estimates those points within a predefined tolerance.

The high point on the generated corneal matching surface 108 (i.e., the point having the greatest Z value) is determined. A cylinder 106 of a predetermined diameter, is then projected onto the corneal matching surface 108 along an axis which is parallel to the Z-axis and passes through the high point. Cylinder 106 preferably has a diameter of 8 mm–9.5 mm, and the closed contour formed by the intersection of cylinder 106 with surface 108 projects as a circle 106' in the X-Y plane. On the matching surface 108, this contour defines the outer margin 26 of the cornea-overlying portion of the yet to be shaped contact lens. The scleral skirt 90 lies radially outward of this margin. The corneal high point will preferably be aligned with the optical center of the optical portion of the lens by design, because the cornea is the most symmetric about this point and, therefore, provides the best optics at this point.

The outer margin 26 of the cornea-overlying portion of the contact lens must fit within the point cloud, so that the surfaces of the lens can be formed based on the measured corneal data. By default, design system 630 places the optical center of the lens above the high point of the cornea. The computer aided design system 630 can then illustrate a default circle 106' (in the X-Y plane) with respect to the point cloud, for example on a monitor screen, so that the operator can be assured that circle 106' falls within the point cloud. Additionally, system 630 can be set up to determine if circle 106' falls within point cloud 100 and, if it does not fall completely within point cloud 100, to alert the user to manipulate the circle (i.e., move the center point and/or change the radius of the circle) so that circle 106' lies within the corneal data point cloud 100. In a worst case scenario, the eye should be rescanned if insufficient data is available from the scanned eye to ensure that the contact lens will fit properly on the patient's cornea. Alternatively, the area of the point cloud can be made larger.

It is to be understood that circle 106' is only a circle when viewed in the X-Y plane (i.e., looking along the Z-axis). Actually, the periphery 26 is elliptical and lies in a plane which is tilted relative to the reference plane. A line perpendicular to this tilted plane which passes through the high point will be referred to as the "local Z-axis" and the tilt of the tilted plane relative to the reference plane will be considered the tilt angle of the cornea.

Figure 7:
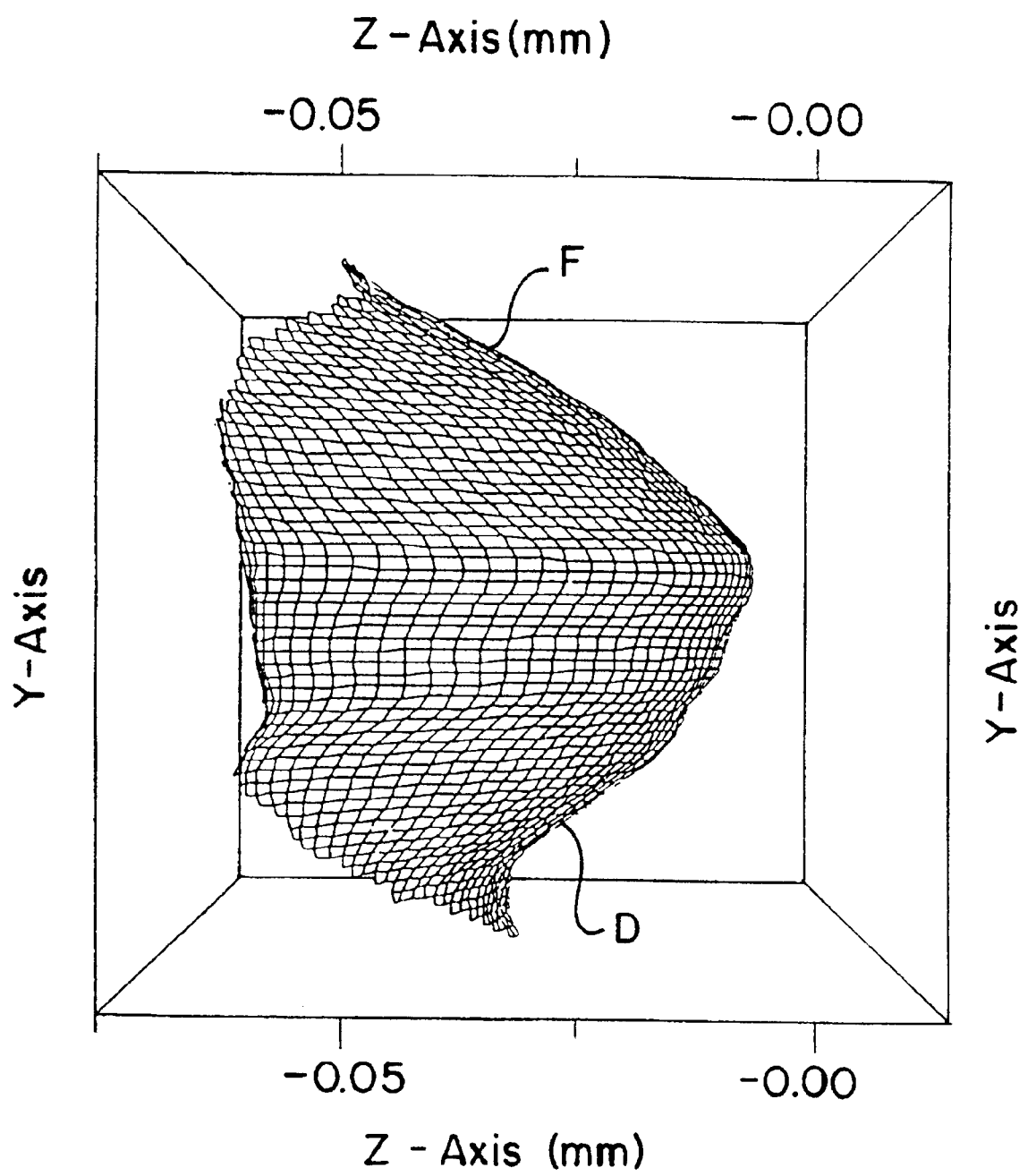
FIG. 7 is a side view of an actual patient's cornea, as generated by a computer aided design system, illustrating the tilt of the cornea, the flattening distortion at the top, and the depressed distortion at the bottom.

FIG. 7 is an elevational side view of an actual patient's cornea as generated by the Computer Aided Design System 630. As used herein, the term "elevational view" means a view in which the surface of the best fit sphere is subtracted from the actual Z-axis values. Thus in an elevational view the deviations from a spherical surface are emphasized and are viewed on a magnified scale. It will be noted that the cornea exhibits flattening distortion, F, at the top and depression distortion, D, at the bottom. At a corneal diameter of 9 mm, this patient exhibits an X-axis tilt of about 1.30° and a Y-axis tilt of about 0.84°. The present inventors have discovered that corneal tilt may vary from eye to eye within the same person. The cornea is tilted, on average, by about 2–3° relative to both the X and Y axes. The applicants have documented an angle of tilt up to 4°. Any contact lens that fails to account for this tilt or the distortion does not align the optical portion of the lens properly with the cornea, likely resulting in reduced visual acuity.

Lens 10 itself can be considered to have an anterior surface 28, a posterior surface 30, an outer scleral skirt 90. The anterior and posterior surfaces 28, 30 each have a central optical portion 32 radially inward and a transition portion 34 having and outer margin 26 (See FIGS. 6A and 6B), which merges into the scleral skirt (not shown in FIGS. 6A and 6B). The posterior surface of the transition region 34 asymmetrically and aspherically matches (including corneal tilt and distortion) the portion of the cornea which lies under the transition region of the lens when the lens is worn in the wearer's eye.

Center portion 32 of the contact lens is the optical portion of the lens and, in a preferred embodiment, is approximately 7.0 mm–7.5 mm in diameter. The geometric lens center 52 of the center portion 32 (and, thus, of the lens 10) is preferably disposed over the high point 18 of the cornea.

The boundary between the center portion 32 and the transition portion 34 is a contour that will also be referred to as drive rail 50. It is generated by projecting a cylinder of a predetermined diameter along the local Z-axis, the intersection of this cylinder and the corneal matching surface 108 defining the drive rail 50. In a preferred embodiment, drive rail 50 has a diameter of 7.0 mm–7.5 mm and most preferably about 7 mm. Boundary 26 preferably has an outer diameter of about 8.5 mm to 11 mm, more preferably about 9 mm–9.5 mm, after which the scleral skirt 90 begins.

To form the surface of lens 10, in a currently preferred exemplary embodiment, the center portion 32 is defined first, followed by the transition portion 34. In each portion 32, 34, the posterior surface is defined first and, thereafter, the anterior surface is defined. For a soft contact lens, the scleral skirt is then defined as a spherical skirt centered about the Z axis.

There will now be described a technique for generating characterizing curves on surface 108, which will be useful below. A plane 110 is constructed which contains the local Z-axis (See FIG. 5). The intersection between plane 110 and surface 108 defines a first characterizing curve 112. Plane 110 is then rotated about the local Z-axis at regular intervals, for example by a 5° increment, as represented by line 114, where its intersection with surface 108 defines a second characterizing curve 116, which is illustrated in dashed lines in FIG. 5. This process continues at fixed rotational increments about the local Z-axis, for example every 5°, until plane 110 has swept 360°, to produce a complete set of characterizing curves, in this case seventy-two (360°÷5°).

Figure 6A:
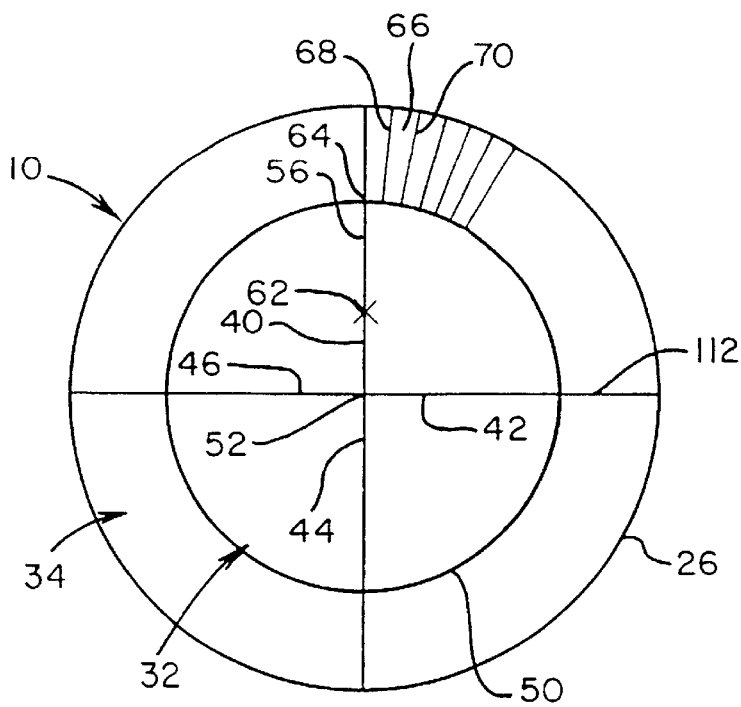
FIGS. 6A and 6B are top elevational view and a perspective, respectively, illustrating how the model of the contact lens of FIG. 1 is constructed, the scleral skirt having been eliminated for convenience of description.
Figure 6B:
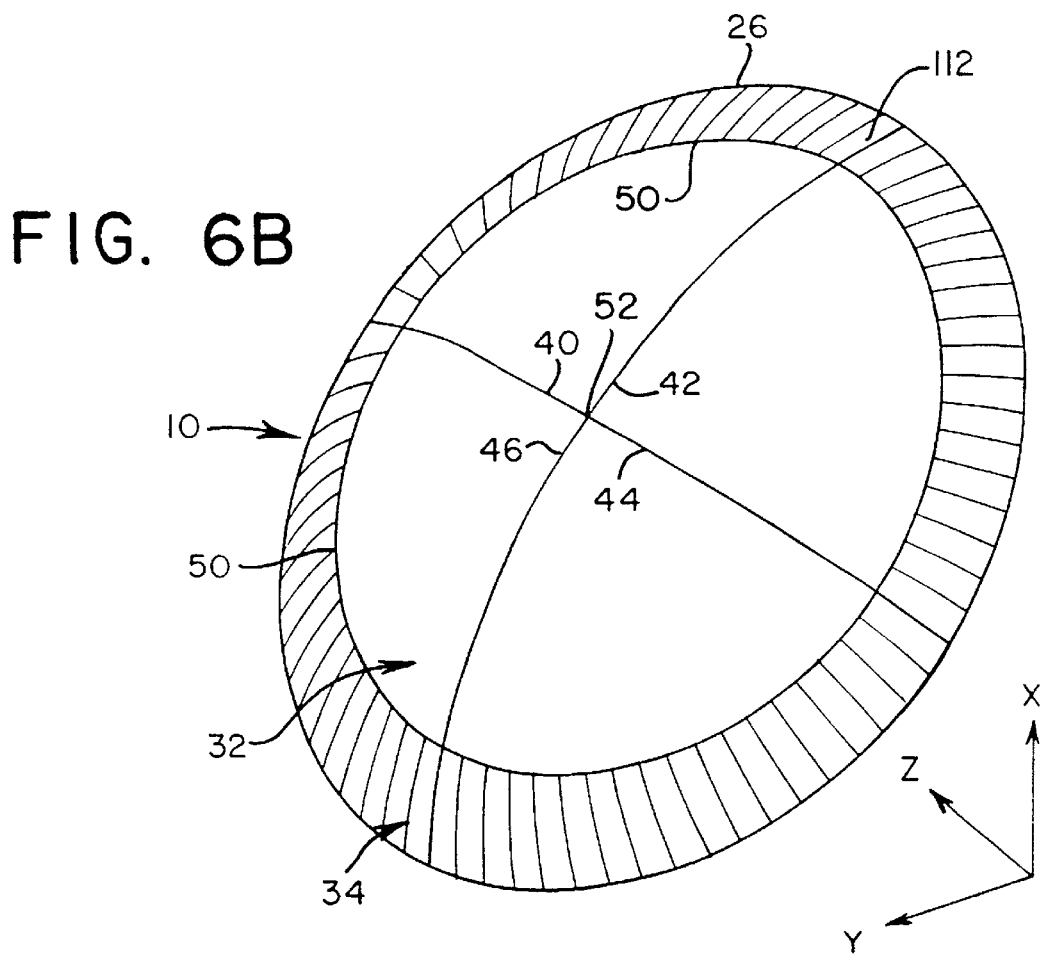

Referring now to FIGS. 6A and 6B, center portion 32 is divided into four quadrants by four arcs, 40, 42, 44, 46. Arcs 40–46 are fitted to a characterizing curve defined by the intersection of a plane containing the local Z axis with the underlying corneal matching surface 108, in the manner described above in relationship to FIG. 5, except the angular rotation is 90°. Each of the arcs 40–46 originates at the common central point 52 and is shaped to provide the best fit to the corresponding characterizing curve. As illustrated in FIGS. 6A and 6B, curve 112 corresponds to a radially extending line, as viewed from top down (i.e., along the local Z-axis), and is used to generate arc 42. As should be readily appreciated, three points will define a circular arc. In a preferred embodiment, those three points are central point 52, the point 64 at which curve 112 intersects drive rail 50, and the radial midpoint 62 of curve 112 between central point 52 and drive rail 50. The radial midpoint of the curve 112 is located at one-half of the radial distance between central point 52 and drive rail 50, as viewed from above. The remaining three arcs 40, 44, 46 are generated in a similar manner at 90° intervals. The posterior surface of each inner optical quadrant of the lens in the center portion 32 (i.e., the surface bounded by a ¼ portion of drive rail 50 and by any two adjacent arcs 40, 42; 42, 44; 44, 46; or 46, 40) can be generated by any known surface blending formula, once the boundaries of the surface have been defined. In a preferred embodiment, the well known formula $Ax^2+By^2+Cz^2+Dxy+Eyz+Fx2+Gx+Hy+Jz+K=O$; where A, B, C, D, E, F, G, H, J and K are constants, is used to generate each quadrant as a quadric surface. The posterior surface is blended between adjacent arcs, for example, from arc 40, along drive rail 50, towards arc 42. This could be thought of as interpolating between curves 40 and 42 with a series of circular arcs, each of which passes through center 52 and rail 50 at a point progressively closer than the previous arc. Thus, the rear optical quadrant surface of the lens is a blended surface, which is known in the art as a "curve-driven" surface. The remaining three quadrant surfaces of the central lens portion on the posterior surface of the lens are then generated in a similar manner, and are blended together at their junctures.

The generated posterior surface of center portion 32 is topography driven. In other words, the shape of the posterior surface of the center portion 32 of the lens is dependent upon the shape of the underlying portion of the cornea. Thus, each local surface segment on the posterior surface in the optical portion of the lens conforms to the shape of the respective local portion of the cornea lying under the local surface segment. The posterior surface, in the optical zone, conforms to the shape of the cornea, as opposed to matching the shape of the cornea, because the curves 112, 116, etc. are closely approximated by arcs 40–46. The anterior surface is formed, as described below, by blending between two adjacent arcs having radii determined based on the required refraction correction using the known Zeiss Simple Lens formula.

The anterior surface of the center portion 32 is preferably generated after the posterior surface of the lens has been generated. The front surface of the lens is shaped to provide for the preferred optics (e.g., spherical or toric). If a toric surface is to be formed, the front surface can be blended by utilizing the known Zeiss Simple Lens formula, which is conventionally used to shape a toric lens. Of course, before the front surface can be formed the practitioner must first input, to the computer aided design system 630, the corrective refraction required for the wearer. This information can be input in a conventional manner so that the computer aided design system 630 can use this information to determine the shape of the front surface of the lens. Because any two adjacent arcs are disposed at a 90° interval, the Zeiss Simple Lens Formula does not need to be modified. The front surface of the lens is thus formed based on and is coplanar with the posterior surface arcs but raised from the posterior surface arcs to provide for the refractive correction, while maintaining minimum thickness of the lens.

It should be noted that arcs 40–46 do not need to be at 90° intervals; this is only for convenience when the Zeiss simple lens formula is used. It should also be noted that the axes disposed 180° apart need not be, and in most cases are not, of equal radii. Thus, the front or anterior surface of the lens is more accurately described as having a multi-toric shape, but, to be consistent with current terminology, the front surface will also be referred to as being torically shaped.

The shape of the transition portion 34 of the lens can now be constructed. The posterior surface of the outer peripheral portion preferably asymmetrically and aspherically matches the shape of the underlying cornea, including corneal tilt and distortion. In the portion 34, curves such as 68, 70 are generated in the same manner as curves 112, 116 except the spacing between the curves is reduced to 5° segments to reduce the amount of surface area for each segment such as 66, so that the resulting shape of the posterior surface of the lens matches the actual shape of the cornea to the greatest extent possible. Each segment 66 is bounded radially by drive rail 50 and by base 26, and bounded circumferentially by a first spline 68 and a second spline 70, which splines estimate the portion of characterizing curves lying between rails 50 and base 26. Splines 68, 70 are mathematical derived curves that are based on the topographical data as represented in the cornea matching surface 108, such that the posterior surface of the lens matches the shape of the underlying cornea. The segments 66 of the posterior surface of the lens disposed between the base 26 and drive rail 50 are blended to form a smooth curve mesh surface between base 26 and drive rail 50.

The anterior surface of transition portion 34 does not have to be shaped to provide optical characteristics to the lens because it is located outside of the optical region of the contact lens. Thus, the front surface can be shaped for a smooth symmetrical or asymmetric transition into the scleral skirt 90. Of course, the minimum edge thickness, which occurs at the base of the lens, is dependent upon the lens material and cannot be too thin, to minimize the risk of cracks forming in the contact lens.

The scleral skirt 90 emanates from margin 26 of the cornea-overlying portion of lens 10. It is designed to have a spherical posterior surface about the Z-axis and to be matched to the average sclera. The data defining the shape of scleral skirt 90 are stored for use by Computer Aided Design System 630, which merges it smoothly into transition portion 34 at the margin 26.

The lens surface data, for both the posterior and anterior surfaces, are now routed to the Command Processor 640 from the Computer Aided Design System 630.

In this embodiment, the Computer Aided Design System 630 will generate a post file describing the entire surface, including posterior, anterior and edge fillet surfaces of the lens. The post file is then passed on to the Command Processor 640. In this manner, the anterior, posterior and edge fillet surfaces of the lens are shaped, pursuant to the information from the Command Processor.

The Command Processor 640 accepts the post files, which contain X-Y-Z data describing the surface of the lens to be shaped, and generates a sequence of commands which controls the Shaping System 650. The Command Processor 640 will take the X-Y-Z data from the Computer Aided Design System 630 and use this data to generate the control signals required to control Lens Shaping System 650, forms a lens, as by shaping lens blanks or by defining appropriate molds. The Command Processor 640 is adapted to Lens Shaping System 650 and both units are generally available from the manufacturers of the Lens Shaping System 650.

Figure 8:
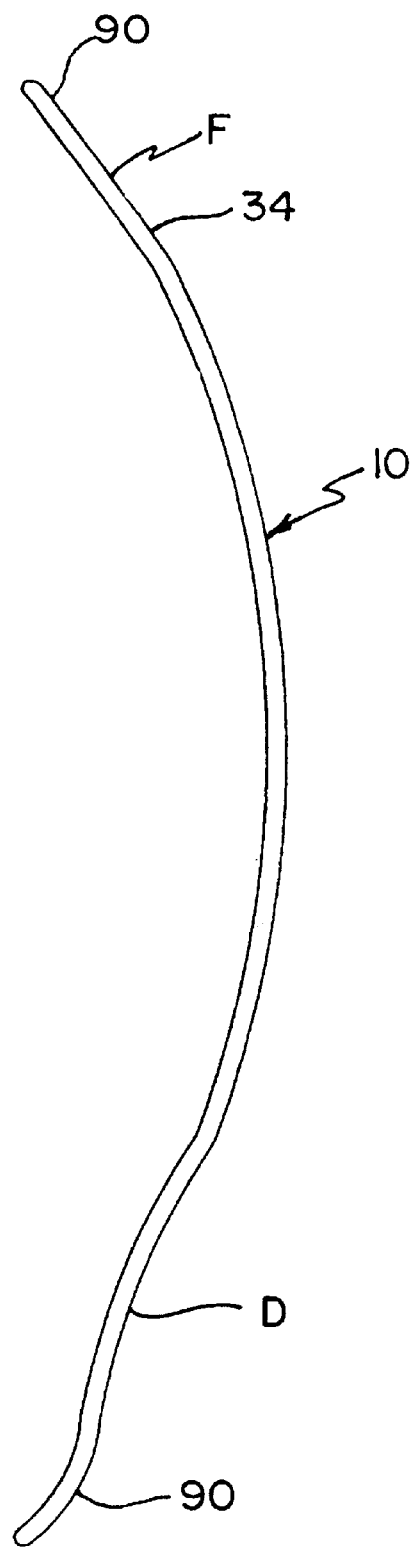
FIG. 8 is a side sectional view of a contact lens embodying the present invention on an enlarged scale.

FIG. 8 is a side sectional view of a lens 10 embodying the present invention. It will be appreciated that the lens has the flattened portion F and the depressed portion D, conforming it to the distortions of the cornea.

Computer Aided Design Systems such as 630 are commercially available under the tradenames Anvil 5000™ from Manufacturing Consulting Services of Scottsdale, Ariz., Attitude™, AutoMILL™ and AutoSURF™ from Autodesk of Sausalito, Calif.; and CADKEY™ from Cadkey Inc., Manchester, Conn.

Soft contact lenses are typically manufactured by spin casting, molding or cutting with a lathe, and commercial systems are available for performing these processes and making the necessary molds, etc. Processor 640 provides data and/or commands in a form useable by such systems.

The present invention encompasses contact lenses made without limitation from a variety of commercially available materials, include soft contact lenses made from hydrophilic polymers (e.g., hydrogels), poly(methyl methacrylate), hard contact lenses, and those that would be considered in between hard and soft.

Above, has been described a high quality, custom contact lens and a process for its manufacture. An outer transition region in which the posterior surface conforms closely to the underlying portion of the cornea including its tilt and the upper and lower distortions. The transition region supports a center, optical portion which estimates asymmetrically and aspherically the shape of the cornea and its tilt and has its optical center aligned with the high point of the cornea. As result of this construction, close conformity is obtained between the cornea and lens, so there is no undue distortion of the lens when it is worn, and it provides consistent optical power.

However, the present invention could prove to be of benefit in a less expensive lens construction. For example, the transition region need not be customized to the patient's eye, but could be provided in a number of different sizes, corresponding to different corneal tilts and distortions. An even simpler construction useful for inexpensive and disposable lenses would be to design the transition region for a statistically average cornea. In these less expensive constructions, the posterior surface of the center portion could be designed as a spherical segment or cap about a statistically average tilted Z-axis with its radius matched to the shape of the average corneal surface. Where a statistically average transition region is used, the radius could also be a statistically average radius.

Having thus described a preferred embodiment of the present invention, it is to be understood that the above described device and method is merely illustrative of the principles of the present invention, and that other devices may be devised by those skilled in the art without departing from the spirit and scope of the invention as claimed below.

What is claimed is:

1. A contact lens constructed to fit on a patient's eye including a cornea which is tilted relative to the line-of-sight of the eye, the cornea also exhibiting upper and lower distortions in shape caused by the eyelids, the contact lens having a central portion and a radially outer transition portion having a posterior surface which overlies the cornea and conforms thereto, the central portion being tilted so as to approximate the corneal tilt.

2. The contact lens of claim 1, wherein the posterior surface of the transition portion conforms closely to at least one of the upper and lower corneal distortions.

3. The contact lens of claim 2 further comprising the central portion having an optical center which is substantially aligned with the most forward point of the cornea.

4. The contact lens of claim 2 wherein the central portion has a posterior surface overlying the cornea which is constructed to estimate asymmetrically and aspherically the shape of the cornea.

5. The contact lens of claim 3 wherein the central portion has a posterior surface overlying the cornea and containing four angularly displaced circular arcs confirming closely to the cornea, the posterior surface varying smoothly between adjacent arcs.

6. The contact lens of claim 1 further comprising the central portion having an optical center which is substantially aligned with the most forward point of the cornea.

7. The contact lens of claim 6 wherein the central portion has a posterior surface overlying the cornea which is constructed to estimate asymmetrically and aspherically the shape of the cornea.

8. The contact lens of claim 6 wherein the central portion has a posterior surface overlying the cornea and containing four angularly displaced circular arcs conforming closely to the cornea, the posterior surface varying smoothly between adjacent arcs.

9. A contact lens constructed to fit on an eye having a cornea which is tilted relative to the pupillary axis of the eye, the cornea also exhibiting upper and lower distortions in shape caused by the eyelids, the contact lens having a central portion and a radially outward transition portion having a posterior surface which overlies the cornea and conforms closely thereto, the central portion being tilted so as to approximate the corneal tilt.

10. The contact lens of claim 9 further comprising the central portion having an optical center which is substantially aligned with the most forward point of the cornea.

11. The contact leans of claim 9 wherein the central portion has a posterior surface overlying the cornea and containing four angularly displaced circular arcs conforming closely to the cornea, the posterior surface varying smoothly between adjacent arcs.

12. The contact lens of claim 9 wherein the lens is a soft contact lens and includes a scleral skirt radially outward of the transition portion.

13. A contact lens constructed to fit on a patient's eye including a cornea which is tilted relative to the line-of-sight of the eye, the cornea also exhibiting upper and lower distortions in shape caused by the eyelids, the contact lens having a central portion which is tilted relative to the line-of-sight and a radially outer transition portion having a posterior surface which overlies the cornea, the contact lens having been selected from a group of contact lenses, each having a different designation related to the corneal tilt included in its central portion posterior surface, the contact lens corresponding to that one of the group in which posterior surface corneal tilt most closely conforms to that of the cornea.

14. A contact lens constructed to fit on a patient's eye including a cornea which is tilted relative to the line-of-sight of the eye, the cornea also exhibiting upper and lower distortions in shape caused by the eyelids, the contact lens having a central portion and a radially outer transition portion having a posterior surface which overlies the cornea and conforms thereto, central portion having a tilt which corresponds to the corneal tilt of a statistically average cornea.

15. The contact lens claim 13 further comprising the central portion having an optical center which is substantially aligned with the most forward point of the cornea.

16. A contact lens constructed to fit on a patient's eye including a cornea which is tilted relative to the line-of-sight of the eye, the cornea also exhibiting upper and lower distortions in shape caused by the eyelids, the contact lens having a radially outer transition portion having a posterior surface which overlies the cornea, the contact lens having been selected from a group of contact lenses, each having a different designation related to the corneal tilt included in its central portion posterior surface, the contact lens corresponding to that one of the group in which posterior surface corneal tilt most closely conforms to that of the cornea, the central portion having an optical center which is substantially aligned with the most forward point of the cornea and a posterior surface constructed to have the shape of a spherical cap formed on an axis which has the corneal tilt of a statistically average cornea.

17. The contact lens of claim 16 wherein the radius of the central portion posterior surface is equal to a value that most closely matches a statistically average cornea.

18. The contact lens of claim 15 wherein the central portion has a posterior surface constructed to have the shape of a spherical cap the radius of which is equal to a value that most closely matches a statistically average cornea.

19. A contact lens constructed to fit on a patient's eye including a cornea which is tilted relative to the line-of-sight of the eye, the cornea also exhibiting upper and lower distortions in shape caused by the eyelids, the contact lens having a central portion and a radially outer transition portion having a posterior surface which overlies the cornea and conforms thereto, central portion having a tilt which corresponds to the corneal tilt of a statistically average cornea, the central portion having an optical center which is substantially aligned with the most forward point of the cornea and a posterior surface constructed to have the shape of a spherical cap formed on an axis which has the corneal tilt of a statistically average cornea.

20. The contact lens of claim 19 wherein the radius of the central portion posterior surface is equal to a value that most closely matches a statistically average cornea.

\* \* \* \* \*